United States Patent Office 3,169,983
Patented Feb. 16, 1965

3,169,983
QUATERNARY AMMONIUM GLYCOL
MONOBORATE SALTS
Don L. Hunter, Long Beach, Calif., assignor to United
States Borax & Chemical Corporation, Los Angeles,
Calif., a corporation of Nevada
No Drawing. Filed June 11, 1962, Ser. No. 201,244
8 Claims. (Cl. 260—462)

The present invention relates as indicated to a new class of compounds, the glycol monoborate salts of quaternary amines, and has further reference to a method for preparing the same.

It is, therefore, the principal object of the present invention to provide as new compositions the quaternary ammonium glycol monoborate salts.

It is a further object of this invention to provide an efficient method for preparing these new quaternary ammonium glycol monoborate salts.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises quaternary ammonium glycol monoborate salts of the formula $$\left[\begin{array}{c} R_1 \\ | \\ R_1-N-R_1 \\ | \\ R_2 \end{array}\right]^{\oplus} \quad O-B\diagup\begin{array}{c}O\\ \diagdown\end{array}R^{\ominus}$$

where $R_1$ is alkyl of from 1 to about 22 carbon atoms, $R_2$ is selected from the group consisting of alkyl of from 1 to about 22 carbon atoms, allyl, benzyl and lower alkyl substituted benzyl, and R is an alkylene radical of from 2 to 3 carbon carbon atoms in length and containing a total of from 2 to 20 carbon atoms.

The quaternary ammonium glycol monoborate salts of the present invention have a wide variety of industrial applications. They can be used as anti-static agents in resins, adhesives and coating compositions. They have use as active bactericides and fungicides in soaps, detergents and dry cleaning compositions, and they are effective as herbicides when used alone or in combination with other phytotoxic materials. Additionally, the present compounds have utility as bacteriostatic agents which prevent microbiological degradation and sludge formation when added to hydrocarbon fuels such as gasoline, jet engine fuels and diesel fuels.

The method for preparing the present quaternary ammonium glycol monoborate salts can best be illustrated by the following equation:

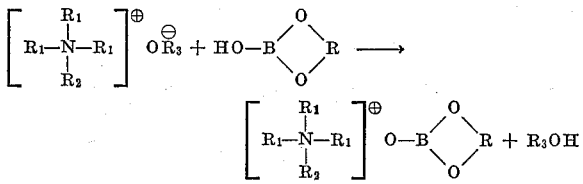

where $R_1$ represents alkyl radicals of from 1 to about 22 carbon atoms and can be the same or different, R is an alkylene radical of from 2 to 3 carbon atoms in length and containing a total of from 2 to 20 carbon atoms, $R_2$ is either an alkyl radical of from 1 to about 22 carbon atoms, allyl, benzyl or lower alkyl substituted benzyl and $R_3$ is either hydrogen or an alkyl radical of from 1 to about 4 carbon atoms. The reaction will proceed when there is an excess of either reactant present. Such excess, however, tends to interfere with the separation of the desired product from the reaction mass, and for the sake of economy and ease of separation, in the preferred embodiment of the invention, I use equimolar amounts of the reactants.

The preferred method for performing the above reaction is a direct single-step process which involves admixing a glycol monoborate with an applicable quaternary ammonium alkoxide or hydroxide in the presence of a solvent which is inert to the reactants. The reaction mixture is then heated to a temperature of about 50° to 100° C., with constant agitation and the reaction by-product, alcohol or water, and a portion of the solvent are removed by distillation. The remainder of the solvent is then removed by distillation at reduced pressure and the quaternary ammonium glycol monoborate salt is recovered from the reaction vessel.

As regards the reactants applicable to the present invention, the first of these are the quaternary ammonium alkoxides and hydroxides having the formula

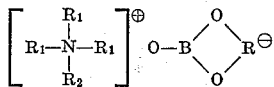

where $R_1$, $R_2$ and $R_3$ have the significance previously assigned. These compounds and their preparation are well known in the art and the following list is illustrative of such reactants:

Benzyltrimethylammonium methoxide
Benzyltrimethylammonium hydroxide
Laurylethyldimethylammonium butoxide
Di-n-octyldiethylammonium propoxide
Stearyl-n-propyldiethylammonium ethoxide
Tetraethylammonium methoxide
n-Hexyltri-n-propylammonium butoxide
Cetyl-n-hexyldi-n-butylammonium isopropoxide
Benzyl-iso-amyldiisopropylammonium hydroxide
Pentadecyltriethylammonium ethoxide The second group of reactants applicable to the present invention are the glycol monoborates having the formula

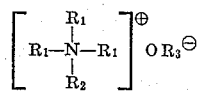

where R is an alkylene radical of from 2 to 3 carbon atoms in length and containing a total of from 2 to 20 carbon atoms. The following list is illustrative of these compounds:

1,2-butanediol monoborate
2-methyl-2-propyl-1,3-propanediol monoborate
1,3-butanediol monoborate
1,3-propanediol monoborate
2-methyl-2,4-pentanediol monoborate
1,2-ethanediol monoborate
2,2-dimethyl-1,3-butanediol monoborate
2-ethyl-1,3-hexanediol monoborate
2,2-diethyl-1,3-hexanediol monoborate
2-methyl-2-ethyl-1,3-propanediol monoborate It is to be clearly understood that the foregoing lists are only a partial enumeration of the reactants applicable to the present invention and are in no way intended to limit the invention.

It will be noted that the present reaction is performed in the presence of a solvent which is inert to the reactants. The common salvents such as benzene, n-heptane, aliphatic alcohols, xylene, aliphatic naphtha, toluene, etc., are all applicable for this purpose. In the preferred embodiment of the invention I use aliphatic alcohols of from 1 to 4 carbon atoms as the inert solvent.

So that the present invention can be more clearly understood, the following examples are given for illustrative purposes:

(I)

To a 2 liter round-bottomed flask equipped with a Rinco stirrer was added 161.3 grams (1.0 mole) of tetraethylammonium methoxide in 300 ml. of methanol and a solution of 116 grams (1.0 mole) of 1,2-butanediol monoborate in 400 ml. of methanol. The reaction mixture was then heated on a steam bath with constant agitation for about 6 hours at which time about one third of the methanol had been removed by distillation. The remaining reaction mass was then subjected to distillation at reduced pressure to remove the excess methanol and the viscous orange liquid residue was transferred to a metal pan. On cooling, 250.1 grams (102% yield) of tetraethylammonium-1,2-butanediol monoborate, an orange glassy solid, was recovered from the metal pan. Chemical analysis of the product yielded the following data:

Calculated for $C_{12}H_{28}BNO_3$: B=4.41%; N=5.71%. Found in product: B=4.33%; N=5.50%.

(II)

To a 2 liter round-bottomed flask equipped with a Rinco stirrer was added 157.8 grams (0.5 mole) of laurylethyldimethylammonium butoxide in 300 ml. of butanol and a solution of 72 grams (0.5 mole) of 2-methyl-2-ethyl-1,3-propanediol monoborate in 300 ml. of butanol. The reaction mixture was then heated at about 120° C. with constant agitation for about 8 hours at which time about one third of the butanol had been removed by distillation. The remaining reaction mass was then subjected to distillation at reduced pressure to remove the excess butanol and the viscous liquid residue was transferred to a metal pan. On cooling, 199.4 grams (103% yield) of laurylethyldimethylammonium - 2 - methyl - 2 - ethyl-1,3-propanediol monoborate, an off-white crystalline solid, was recovered from the metal pan. Chemical analysis of the product yielded the following data:

Calculated for $C_{22}H_{48}BNO_3$: B=2.81%; N=3.63%. Found in product: B=2.71%; N=3.41%.

(III)

To a 2 liter round-bottomed flask equipped with a Rinco stirrer was added 83.6 grams (0.5 mole) of benzyltrimethylammonium hydroxide in 150 ml. of methanol and 72 grams (0.5 mole) of 2-methyl-2,4-pentanediol monoborate. The reaction mixture was then heated on a steam bath with constant agitation for about 6 hours and about one third of the methanol was removed by distillation. The remaining reaction mass was then subjected to distillation at reduced pressure to remove the remaining methanol. About 148.4 grams (101% yield) of benzyltrimethylammonium-2-methyl - 2,4 - pentanediol monoborate was recovered from the flask. Chemical analysis of the product yielded the following data:

Calculated for $C_{16}H_{28}BNO_3$: B=3.69%; N=4.78%. Found in product: B=3.65%; N=4.69%.

Other modes of applying the principle of the invention may be employed, change being made as regards the details described, provided the features stated in any of the following claims or the equivalent of such be employed.

I, therefore, particularly point out and distinctly claim as my invention:

1. Quaternary ammonium glycol monoborate salts of the formula

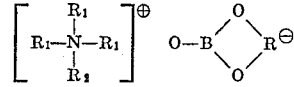

where $R_1$ is an alkyl of from 1 to about 22 carbon atoms, $R_2$ is selected from the group consisting of alkyl of from 1 to about 22 carbon atoms, allyl, benzyl and lower alkyl substituted benzyl, and R is an alkylene radical of from 2 to 3 carbon atoms in length and containing a total of from 2 to 20 carbon atoms.

2. Tetraethylammonium-1,2-butanediol monoborate.
3. Laurylethyldimethylammonium-2-methyl-2-ethyl-1,3-propanediol monoborate.
4. Benzyltrimethylammonium-2-methyl-2,4-pentanediol monoborate.
5. The method for preparing quarternary ammonium glycol monoborate salts of the formula

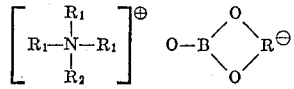

which comprises heating an admixture of a glycol monoborate of the formula

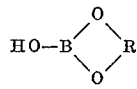

and a quaternary ammonium salt of the formula

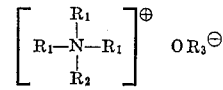

in the presence of a solvent inert to said reactants, continuously removing the reaction by-product by distillation and recovering said quaternary ammonium glycol monoborate salt from the residual reaction mass, where $R_1$ is an alkyl of from 1 to about 22 carbon atoms, $R_2$ is selected from the group consisting of alkyl of from 1 to about 22 carbon atoms, allyl, benzyl and lower alkyl substituted benzyl, $R_3$ is selected from the group consisting of hydrogen and alkyl of from 1 to about 4 carbon atoms, and R is an alkylene radical of from 2 to 3 carbon atoms in length and containing a total of from 2 to 20 carbon atoms.

6. The method of claim 5 where said reactants are 1,2-butanediol monoborate and tetraethylammonium methoxide.

7. The method of claim 5 where said reactants are 2-methyl-2-ethyl-1,3-propanediol monoborate and laurylethyldimethylammonium butoxide.

8. The method of claim 5 where said reactants are 2-methyl-2,4-pentanediol monoborate and benzyltrimethylammonium hydroxide.

No references cited.

CHARLES B. PARKER, *Primary Examiner.*